UNITED STATES PATENT OFFICE.

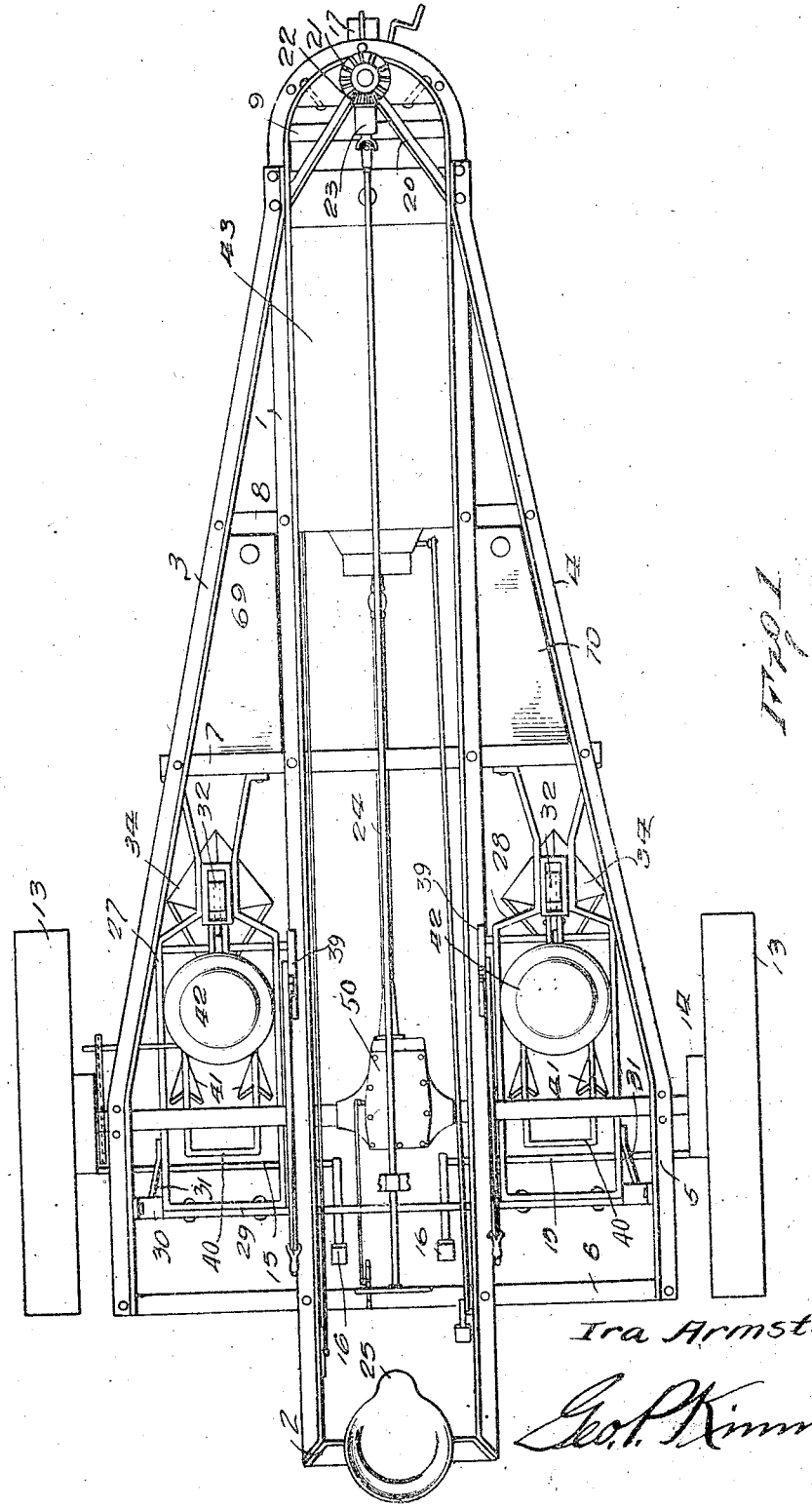

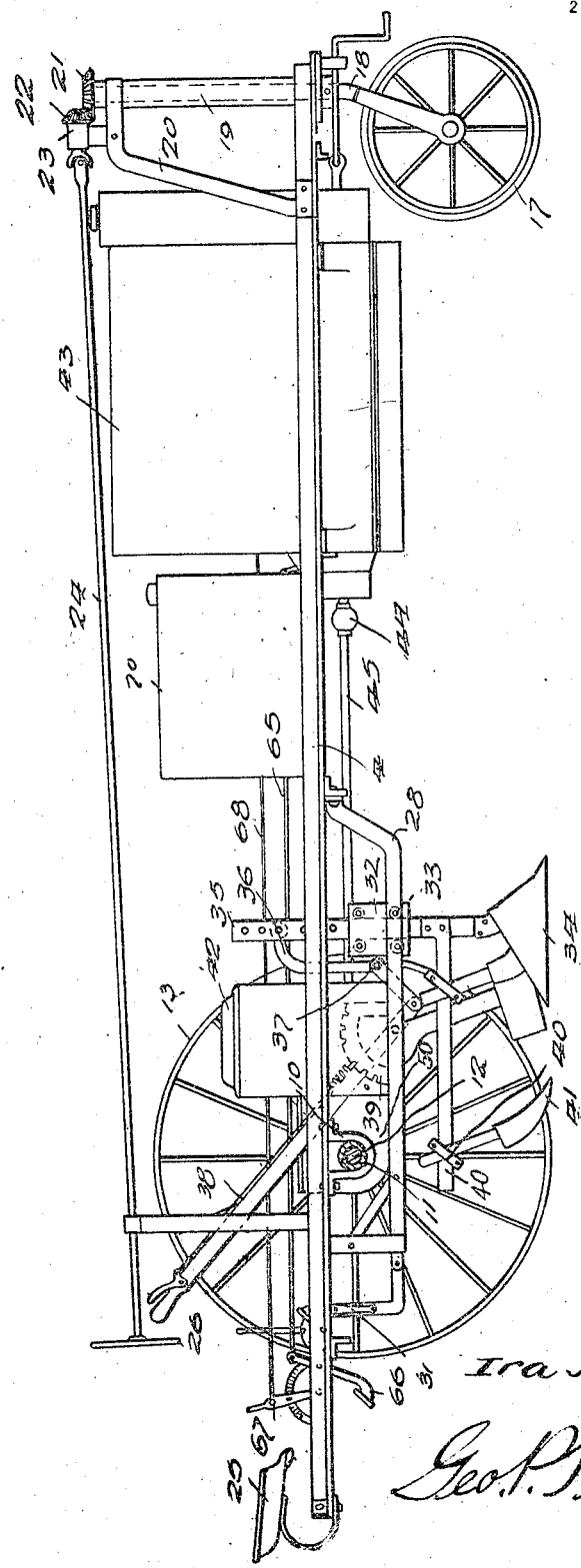

IRA ARMSTRONG, OF MERKEL, TEXAS, ASSIGNOR, BY DIRECT AND MESNE ASSIGNMENTS, TO DIXIELAND MOTOR TRUCK COMPANY, OF BOWIE COUNTY, TEXAS.

POWER-DRIVEN-IMPLEMENT FRAME.

1,328,222.

Specification of Letters Patent.  Patented Jan. 13, 1920.

Application filed May 21, 1918. Serial No. 235,815.

*To all whom it may concern:*

Be it known that I, IRA ARMSTRONG, a citizen of the United States, residing at Merkel, in the county of Taylor and State of Texas, have invented certain new and useful Improvements in Power-Driven-Implement Frames, of which the following is a specification.

This invention relates to improvements in tractors and it is the principal object of the invention to provide a tractor especially adapted for agricultural work and which is so constructed as to carry various forms of agricultural devices, thus eliminating the pulling of the same, hence, avoiding excessive draft and strain on the frame of the tractor and also enable a user to operate the same in comparatively confined or limited spaces.

Another and equally important object of the invention is to provide the tractor with a frame of light but rigid construction capable of successfully withstanding all shocks, jars and vibration incident to normal use and to endure and diffuse abnormal stress throughout the same.

Other independent objects are to provide features of construction of portions of the tractor which tend toward the attainment of the above aims irrespective of the relation in which they are used.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

In the drawings:

Figure 1 is a top plan view of the improved tractor,

Fig. 2 is a side elevation thereof.

Having more particular reference to the drawings, in connection with which like reference characters will designate corresponding parts throughout the several views, the tractor includes a frame comprising a longitudinally disposed substantially U-shaped body 1, the rear ends of which are engaged by a cross bar 2, while diagonal braces 3 and 4 are connected by rivets or other suitable fastening devices at their forward ends to the forward end of the body 1 while the remaining ends are offset as at 5 and connected to the opposite ends of a cross bar 6. Other cross bars 7 and 8 are connected at their opposite ends to the intermediate portions of the braces 3 and 4, thus serving to prevent undue movement of the same and adding materially to their rigidity, while another cross bar 9 is arranged at a point in proximity to the forward end of the body 1 and is connected at its opposite ends to the adjacent sides thereof. Bearings 10 are engaged with the under sides of the intermediate portions of the several braces 3 and 4 and receive a transversely disposed axle housing 11 therein in which a drive axle 12 is mounted and carries wheels 13 on its opposite ends; brake drums being arranged on the inner sides of the wheels 13 and provided with suitable brake bands 14 connected to operating shafts 15, which shafts in turn, are engaged by foot levers 16 arranged on the tractor frame at a point convenient to the operator.

A third or steering wheel 17 is arranged forwardly of the body 1 of the frame and is rotatably mounted in the forked lower end of a spindle 18 received in a vertically disposed bearing sleeve 19 mounted on said body 1 and having its upper end engaged by angle arm 20; a bevel gear 21 is carried on the upper end of the spindle 18 and having connection with a similar gear 22 mounted on the adjacent end of a sub-shaft arranged in a bearing bracket 23 carried on the upper end of the angle arm 20, which shaft is in turn universally jointed to the adjacent end of a steering shaft 24 extending longitudinally of the frame to a point in proximity to the operator's seat 25, whereat it is provided with a suitable form of steering wheel or similar handle 26.

Sub-frames 27 and 28, identical in construction, are provided and are formed from single lengths of metal bent upon themselves, as clearly shown in Fig. 1 and having the opposite ends thereof offset and apertured in order that they can be secured to the adjacent portions of the cross bar 7, while the remaining ends thereof are connected by a transversely extending bar 29 and are supported with relation to the tractor frame by means of offset links 30, which as will be noted, have their lower ends secured thereto while the upper or remaining ends are secured to adjacent portions of the diagonal braces 3 and 4; other braces 31 being engaged with the links 30 and portions of the sub-frames 27 and 28 for an obvious purpose. In this connection, it is to be noted that the several sub-frames 27 and 28 are supported at points below the main frame and below the axle and axle housing, thus, permitting the attaching of agricultural devices thereto without interference therefrom. Boxings 32 are carried upon the forward portions of each of the sub-frames 27 and 28 and have rollers 33 mounted therein and adapted to engage with the shank portions of earth working elements 34, these shank portions being indicated by the numeral 35 and having a plurality of openings formed therein whereby to permit adjustable connection with an arm 36, the lower end of which is engaged by a link 37 having pivotal connection with the lower end of an operating lever 38, said lever being mounted in suitable bearings on its respective sub-frame. Toothed segments 39 are arranged adjacent each of the operating levers 38 and as will be understood are adapted to be engaged by the slidable pawls arranged thereon in order that their levers will be temporarily locked in adjusted positions. Thus, it is apparent that upon the rocking of either of the levers 38, their respective earth working elements 34 can be raised or lowered with relation to the earth and as a consequence, they can be engaged with the earth at varying depths. Connected at their opposite ends to the lower portions of the shanks 35 are substantially U-shaped frames 40 carrying clamping clips 40' thereon, which clips couple the shank portions of shovels 41 to the frames 40. Arranged on the intermediate portions of the secondary frames 27 and 28 are planters indicated in their entireties by the numeral 42, the seed boots of these planters extending downwardly to points adjacent the shovels 41 supported on the U-shaped frames 40.

Supported on the forward portion of the body 1 is an engine 43 or other suitable form of prime mover, the power shaft of which is connected by means of a universal joint 44 to the longitudinally disposed driving shaft 45, said driving shaft extending into a gear housing 50 wherein will be mounted suitable gearing for transmitting rotation of the shaft 45 to the axle 12.

The driving shaft is provided with the ordinary form of clutch, not shown, having connection with an operating rod 65 extending longitudinally of the machine and having its remaining end pivoted to a foot lever 66 mounted on the frame at a point near the operator's seat 25.

A control lever 67 is also mounted on the frame near the seat 25 and has connection with a connecting rod 68 engaged with the fuel supply valve of the engine, it if course being understood in this connection that a similar lever is provided for the ignition mechanism of the engine.

A fuel tank 69 is supported on the frame, obviously, between portions of the cross bars 7 and 8 and has connection with the charge forming device of the engine 43, while a similar tank 70 is supported on the opposite side of the frame by the adjacent portions of the bars 7 and 8 and has connection, by way of suitable conduits, with the water circulating system of the engine.

From the foregoing, it will be understood by persons skilled in the art that I have provided an exceedingly efficient and light but rigid tractor and tractor frame and further, a machine, which to the mode of connection of the agricultural implements therewith can be operated in confined or limited spaces and also obviate loss of power or the imparting of excessive or undue stress to the same.

It is to be also understood that various forms of agricultural devices may be secured to the improved tractor, other than those illustrated on the accompanying drawings, such as conditions or preference may dictate. If desired, the tractor may be used for carrying various forms of road scrapers and other devices.

As hereinbefore indicated, I do not wish to be understood as confining the invention to the particular embodiment chosen for illustration herein, nor to the exact construction, arrangement and adaption of parts shown and described, but I reserve the right to make any changes and alterations that fairly fall within the spirit and scope of the invention.

I claim:

1. In a machine of the character described a main frame having side extensions, sub-frames positioned beneath the side extensions, vertical bearing housings carried by the sub-frames, standards slidably passing through the housings, yokes carried by the standards, earth opening means connected with the standards and yokes, hoppers carried by the sub-frames and having spouts extending in operative relation to the earth opening means, and adjusting means carried by the sub-frames and connected with the standards for vertically adjusting the same and releasably holding the earth opening means in adjusted position with respect to the ground.

2. In a tractor a frame having longitudinally extending bars and side bars extending in rearward and divergent relation to provide side extensions for the frames, driving wheels connected with the rear portion of the frame and positioned outside the side extensions thereof, a steering wheel adjacent the forward end of the frame, sub-frames positioned beneath the side extensions of main frame and having side arms, bearing housings secured between the forward end portion of the side arms, hoppers connected with the side arms to the rear of said housings, standards slidably passing through the housings, U-shaped brackets connected with the standards beneath the housings, earth opening means connected with the brackets and with the standards, spouts leading from the hoppers in operative relation to the earth openings means, adjusting means connected with the sub-frames and with the standards for vertically adjusting the standards and retaining the same in an adjusted position, and a source of power carried by the main frame adjacent the forward ends and having operative connection with the driving wheels.

3. In a tractor a main frame having side extensions, sub-frames secured beneath the side extensions of the main frame, standards slidably mounted in the sub-frames, adjusting means carried by the sub-frames and connected with the standards for vertically adjusting the same, brackets carried by the standards beneath the sub-frames, earth opening means carried by the standards and by the brackets, and hoppers carried by the sub-frames and having outlet spouts extending in operative relation to the earth opening means.

In testimony whereof, I affix my signature hereto.

IRA ARMSTRONG.